June 30, 1964 R. COLOMBO 3,138,825
SCREW PRESS FOR EXTRUDING SYNTHETIC THERMOPLASTIC MATERIALS
Filed May 14, 1962 2 Sheets-Sheet 1

June 30, 1964  R. COLOMBO  3,138,825
SCREW PRESS FOR EXTRUDING SYNTHETIC THERMOPLASTIC MATERIALS
Filed May 14, 1962  2 Sheets—Sheet 2

United States Patent Office 3,138,825
Patented June 30, 1964

3,138,825
SCREW PRESS FOR EXTRUDING SYNTHETIC
THERMOPLASTIC MATERIALS
Roberto Colombo, Turin, Italy, assignor to S.A.S. Lavorazione Materie Plastiche (L.M.P.) di M. I. Colombo & C., Turin, Italy
Filed May 14, 1962, Ser. No. 194,261
Claims priority, application Italy July 7, 1961
4 Claims. (Cl. 18—12)

This invention relates to screw presses for extruding synthetic thermoplastic materials.

It is known that a screw press should essentially perform three functions, namely mixing, compressing and heating the material to extrusion conditions, these three functions at least partly overlapping in time, depending upon the specific structure of the press. More particularly, in order to obtain an extruded article of high quality it is essential to effect as thorough a mixing as possible, so as to avoid any heterogeneousness in the extruded material. This applies more particularly, though not exclusively, to presses preparing so-called "molding powders," in which heterogeneous material is charged and "spaghetti" of as homogeneous a composition as possible are extruded, the "spaghetti" being normally of a diameter of about 2–4 mm. and being cut to the form of minute cylinders constituting the "powders" or, more appropriately, granulated material.

Repeated attempts have been made to improve mixing to make it as thorough as possible. An attempt was made at increasing the number of cooperating screws and/or combining together screws differing in length and diameter, or providing multi-stage presses effecting intermediate extrusions between their individual stages, etc. This often led to a homogeneous product, but entailed considerable structural complications.

A main object of this invention is to provide for effecting thorough mixing by employing extremely simple means.

A further object of this invention is to attain the above-mentioned object simply by modifying the screw on existing presses, while leaving all remaining parts of the said presses unaltered.

A further object of this invention is to attain the above-mentioned objects by as low an expense of work and material as possible.

With the above mentioned objects in view this invention starts from screw presses of the type comprising a pair of intermeshing equi-rotating screws, and is characterized by the fact that the core of each screw is formed with at least two cylindrical local non-threaded bosses spaced by a threaded section, each boss being transversely aligned with the boss on the other screw and being in substantially linear contact with the latter, the ends of each boss merging into their respective core, the length of the cylindrical portion of each boss equalling at least its diameter.

Further characteristic features and advantages of this invention will be understood from the appended description referring to the accompanying drawing, wherein:

FIGURES 1 and 2 form together a longitudinal part-sectional view of the barrel of a twin-screw extrusion press improved according to this invention;

It should first of all be noted that, though the drawings show a press including two screws only, the invention is as useful in connection with presses including a larger number of screws, provided two intermeshing equi-rotating screws as further explained hereafter are provided.

Figure 1:
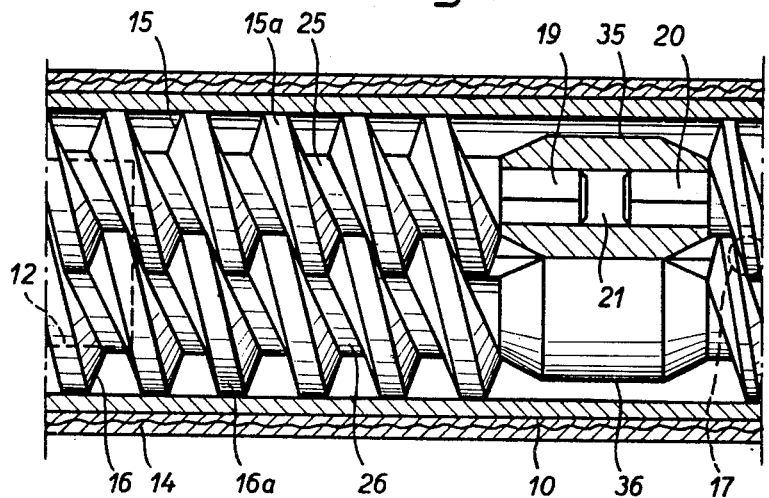

In the drawings, a barrel 10 of an extrusion press is provided at its forward end with an extrusion head 11 and is fed with thermoplastic material through a hopper (not shown) fitted to the rear end of the barrel, the projection of the feed opening being indicated by a dashed line 12 in FIG. 1. The barrel 10 is provided with an induction-heating jacket 14 including an electric winding, the ends of which are adapted to be connected with an alternating current generator, the frequency of the current being sufficient for inductive heating of the barrel and screws therein to the desired temperature.

As mentioned above two screws only 15, 16, respectively, operate in the barrel, the screw threads 15a, 16a, respectively, fully occupying the barrel bore and intermeshing. As will be seen from the inclination of the screw threads, the screws 15, 16 rotate concurrently. Of course, the direction of rotation is such that the material fed through the opening 12 is conveyed by the screws towards the extrusion head 11.

In the embodiment shown the cores 25, 26, of screws 15, 16 respectively are each formed with two local bosses 35, 35a and 36, 36a, respectively, which are of cylindrical configuration with frusto conical ends. The bosses are transversely aligned by pairs 35 with 36 and 35a with 36a. The diameter of each boss is the average of the core and screw-thread diameter, so that the two bosses in each pair are almost in linear sliding contact with each other. In practice this contact does not amount to actual friction; however, what matters is that the cylindrical zones on the bosses in each pair are in a linear sealing relationship with respect to the thermoplastic material process in the press.

It was found that the axial length of the cylindrical zones on the bosses is actually a complex function of a number of variables including the pitch of the screw threads preceding and following a given boss, diameter of the core and thickness of the threads. However, considering the conditions normally met with in screw-presses, wherein the ratios between the core diameters, screw-thread pitches and other values are contained within relatively narrow limits, the above complex function is liable to be considerably simplified. It was mentioned that the diameter of the cylindrical zones is dependent upon the diameters of the core and screw-threads so that, by way of a first approximation the length of the said zones can be expressed as a simple function of their diameter. Broadly, such length should not be less than the diameter of the bosses and, preferably, should not exceed twice the said diameter. Greater lengths are generally superfluous and may lead to overheating of the material.

The cylindrical surfaces of the bosses are smooth after machining on a lathe. Generally, grinding by a grinding wheel or other high precision tools is not required. However, the surfaces can be shotpeened, which is useful in that the bosses are superficially hardened thereby and become more wear resistant, mixing of the material being also slightly improved. However, contrarily to what might be assumed at first sight, it is not advisable to roughen the surface of the bosses such as by means of grooves, notches or the like, the only roughening which may be useful within certain limits and still tolerable by the thermoplastic material being that resulting from sand-blast and electrolytic surface etching.

The barrel 10 is preferably provided between the two pairs of bosses 35, 36 and 35a, 36a with a fitting 17 for connecting the inside of the barrel with a suction pump arranged to suck from the cylinder any gas and vapors evolved by the material being processed.

As will be seen from FIG. 1, the improvement according to this invention can be employed in connection with existing presses by utilizing the screws thereon. The screw 15 which is assumed to have been initially of a continuous-thread type, as shown on the drawing is cut to two axially aligned sections having prismatic ends 19, 20 facing each other. The boss 35 is in form of a separate block in which an axial prismatic hole 21 is machined the hole cross-section being complementary to the cross-section of the prismatic ends 19, 20, so that the block 35 acts as a joint for the two sections of the screw 15. The bosses 35a, 36 and 36a are of similar construction.

Figure 3:
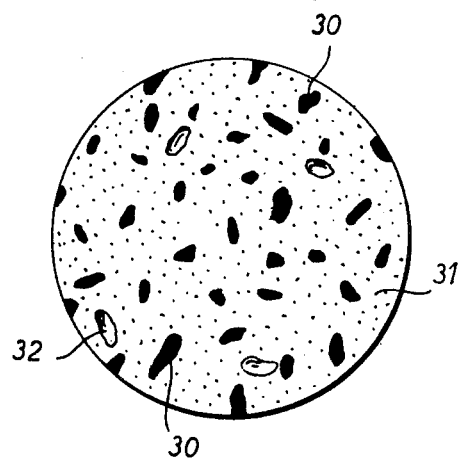
FIG. 3 is a macrographic representation of the cross section of a spaghetti obtained from a press according to FIGS. 1 and 2 before its improvement.
Figure 4:
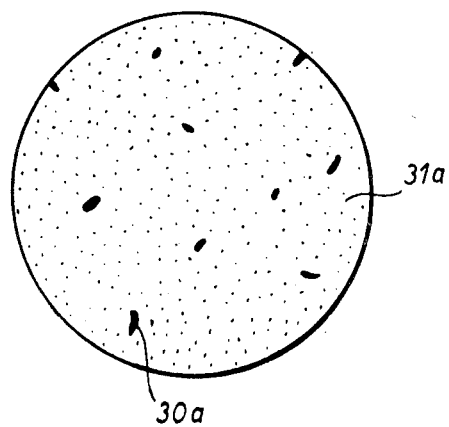
FIG. 4 is a similar representation to FIG. 3 of a spaghetti obtained after the improvement.

The results afforded by this invention, which appear from comparison of FIGS. 3 and 4, were confirmed by a number of experimental tests. The tests were carried out by thoroughly mixing together white and black molding powders (granular stock) of polyvinyl chloride in the proportion of 3:1 by volume, processing the mixture on a press, extruding spaghetti and examining the macrographic structure of the cross section of the latter. When a thorough mixing, has been effected the cross section should be of a uniform grey appearance characterizing satisfactory homogeneization. Otherwise, black particles of various size would be exhibited on the white-grey background.

Figure 2:
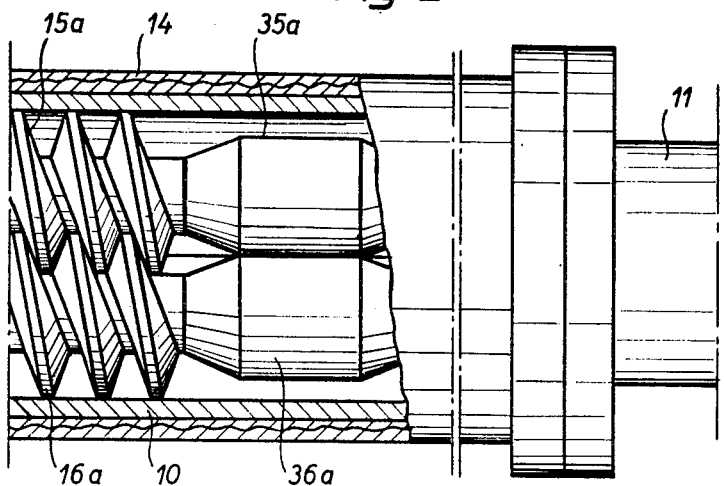

The presses employed for carrying out the tests were similar; however, a series of runs was made with screws each provided with two bosses substantially as shown in FIGURES 1 and 2, while in the other series of runs the screws were of the continuous-thread type. Moreover, in the first series the suction fitting 17 was operated in order to check its effectiveness in respect of gaseous occlusions in the extruded article.

The typical cross section of the blank obtained by the use of boss-free screws is shown in FIG. 3, in which relatively large black particles 30 are scattered in the white-grey matrix 31. Cavities 32 due to gas occlusions are moreover visible. The actual diameter of the sectoin shown in FIG. 3 was 4 mm.

The typical cross section of the blank obtained from presses improved according to this invention is shown in FIG. 4, in which the white-grey matrix 31a is contaminated by a few relatively small black particles 30a and is consequently of a satisfactory homogeneous appearance. No gas occlusions were ascertained; only microscopic bubbles could be disclosed by enlargements of at least 100 times.

It will be understood that this invention is not limited to the embodiment shown in FIGS. 1 and 2, for it will be obvious that the latter can be modified as required by circumstances, without departing from the scope of the appended claims.

What I claim is:

1. A screw-press for extruding thermoplastic materials comprising; a press barrel, a pair of concurrently rotating closely intermeshing screws rotating in the barrel, the barrel having an inside configuration to closely embrace the screws so as to avoid undesirable back flow of the materials, the barrel having a charging aperture and an extrusion head, the screws being arranged in the barrel to advance the materials from the aperture to the head, each screw including a core and screw threads extending therefrom, the core of each screw being formed with at least two substantially smooth non-threaded local bosses having a cylindrical central portion, the bosses or each screw being spaced by screw threads on each screw, each boss being transversely aligned with a boss on the other screw and being substantially in linear contact relationship thereto, the ends of each boss merging into the core of their respective screws, and the length of the central cylindrical portion of each boss at least equaling its diameter.

2. Screw-press as claimed in claim 1, wherein the surface of each boss is shotpeened.

3. Screw-press as claimed in claim 1, wherein the length of the cylindrical portion of each boss does not exceed twice its diameter.

4. Screw-press as claimed in claim 1, wherein a suction fitting is provided between the two pairs of bosses.

References Cited in the file of this patent

UNITED STATES PATENTS 2,733,051   Street _____ Jan. 31, 1956

FOREIGN PATENTS 232,413   Switzerland _____ Aug. 16, 1944